United States Patent
Fan

(10) Patent No.: US 11,262,599 B2
(45) Date of Patent: Mar. 1, 2022

(54) METHOD AND DEVICE CAPABLE OF RECOVERING VISION

(71) Applicant: BEIJING YUANDIAN MINGSHI TECHNOLOGY CO. LTD, Beijing (CN)

(72) Inventor: Yi Fan, Beijing (CN)

(73) Assignee: BEIJING YUANDIAN MINGSHI TECHNOLOGY CO. LTD, Beijing (CN)

( * ) Notice: Subject to any disclaimer, the term of this patent is extended or adjusted under 35 U.S.C. 154(b) by 124 days.

(21) Appl. No.: 16/631,944

(22) PCT Filed: Jul. 18, 2018

(86) PCT No.: PCT/CN2018/096071
§ 371 (c)(1),
(2) Date: Mar. 5, 2020

(87) PCT Pub. No.: WO2019/015597
PCT Pub. Date: Jan. 24, 2019

(65) Prior Publication Data
US 2021/0231976 A1 Jul. 29, 2021

(30) Foreign Application Priority Data

Jul. 18, 2017 (WO) .............. PCT/CN2017/0093394

(51) Int. Cl.
*G02C 7/06* (2006.01)
*G02C 7/08* (2006.01)
(52) U.S. Cl.
CPC ................ *G02C 7/06* (2013.01); *G02C 7/08* (2013.01)

(58) Field of Classification Search
USPC ........ 351/55, 159.48, 159.7, 159.73, 159.75, 351/159.78
See application file for complete search history.

(56) References Cited

U.S. PATENT DOCUMENTS

| 3,583,790 A | 6/1971 | Baker | |
| 5,162,824 A * | 11/1992 | Klemka | G02C 7/088 351/158 |

(Continued)

FOREIGN PATENT DOCUMENTS

| CN | 87211878 U | 6/1988 |
| CN | 2552042 Y | 5/2003 |

(Continued)

*Primary Examiner* — Darryl J Collins
(74) *Attorney, Agent, or Firm* — Greer, Burns & Crain, Ltd.

(57) ABSTRACT

Method of recovering vision by using a pair of glasses, comprising: dividing a diopter range into multiple diopter intervals with continuous diopter variation; selecting a first diopter interval and a second diopter interval from the multiple diopter intervals according to a user's vision recovery requirement which is lower than the user's actual diopter; selecting a left lens group corresponding to the first diopter interval and a right lens group corresponding to the second diopter interval of the glasses, which both the left lens group and the right lens group include a movable lens and a stationary lens; continuously adjusting the diopter of the glasses to be lower than the user's actual diopter, so that the adjusted diopter of each lens group satisfy the user's vision recovery requirement.

10 Claims, 6 Drawing Sheets

(56) References Cited

U.S. PATENT DOCUMENTS

| | | | | |
|---|---|---|---|---|
| 5,644,374 A * | 7/1997 | Mukaiyama | ............ | G02C 7/061 |
| | | | | 351/159.42 |
| 7,934,831 B2 * | 5/2011 | Spivey | .................... | G02C 7/02 |
| | | | | 351/159.73 |
| 2014/0211148 A1 * | 7/2014 | Crosby | .................. | G02C 7/024 |
| | | | | 351/159.7 |
| 2017/0192253 A1 * | 7/2017 | Rubinstein | ............. | G02C 7/081 |

FOREIGN PATENT DOCUMENTS

| | | |
|---|---|---|
| CN | 101133354 A | 2/2008 |
| CN | 101884003 A | 11/2010 |
| CN | 105182566 A | 12/2015 |
| CN | 105765445 A | 7/2016 |
| CN | 105769116 A | 7/2016 |
| CN | 205620626 U | 10/2016 |
| CN | 107340582 A | 11/2017 |
| WO | WO2014198027 A1 | 12/2014 |

* cited by examiner

METHOD AND DEVICE CAPABLE OF RECOVERING VISION

CROSS-REFERENCE TO RELATED APPLICATIONS

This application is a 371 US national stage application of PCT/CN2018/096071 filed Jul. 18, 2018, which claims the benefit of priority from Chinese Patent Application PCT/CN2017/093394 filed Jul. 18, 2017, the entire disclosures of which are herein incorporated by reference.

FIELD OF THE INVENTION

The invention relates to the field of glasses, in particular to a method and a device capable of recovering vision.

BACKGROUND OF THE INVENTION

In the description of the related art, an axial diopter is varied when two specially configured lenses are moved in parallel in a vertical and axial direction. In accordance with this principle, the related art has constructed eyeglasses that manually vary the diopter of the eyeglasses. However, the diopter variation range of the glasses is large, for example, between 0 and 1000 (i.e. [0/100, 1000/100] D or [0.0, 10.0] D), so that the adjustment precision is not high, and the problem of inaccurate diopter adjustment exists.

SUMMARY OF THE INVENTION

The embodiments of the invention provide a method and a device capable of recovering vision to solve the problems of low diopter adjustment precision and accuracy for glasses.

The method capable of recovering vision provided by the embodiments of the invention comprises the steps of:

dividing a diopter variation range [0, N] (i.e. [0/100, N/100] D) into n diopter intervals with continuous diopter variation;

setting the diopter variation ranges of the 1st to nth diopter intervals to [0, N/n], [1+N/n, 2N/n], . . . , and [1+(n−1)N/n, N] (i.e. [0/100, (N/n)/100] D), [(1+N/n)/100, (2N/n)/100] D, . . . , and [(1+(n−1)N/n)/100, N/100] D);

manufacturing a pair of glasses according to the vision recovery requirement of a user, wherein the diopter variation ranges of the left lens group and the right lens group of the glasses respectively correspond to one diopter interval of the n diopter intervals;

for any one of the left lens group and the right lens group, inquiring a current diopter of the lens group after receiving a desired diopter of the user;

determining an adjustment amount of the movable lens required to move relative to the stationary lens in the lens group according to the desired diopter and the current diopter; and driving the movable lens to move by an electric drive module arranged in the glasses according to the adjustment amount of the movable lens required to move relative to the stationary lens.

Preferably, the manufacturing a pair of glasses according to the vision recovery requirement of a user, wherein the diopter variation ranges of the left lens group and the right lens group of the glasses respectively correspond to one diopter interval of the n diopter intervals, and the method comprise:

selecting a diopter interval corresponding to the left lens group and a diopter interval corresponding to the right lens group from the n diopter intervals according to the vision recovery requirement of the user;

for any one of the left lens group and the right lens group, determining a variation range of a diopter control amount $\Delta$ corresponding to the diopter interval of the lens group according to the corresponding relationship between the diopter and the diopter control amount $\Delta$;

determining a variation range of a lens thickness t corresponding to the variation range of the diopter control amount $\Delta$ according to the corresponding relationship between the lens thickness t and the diopter control amount $\Delta$; and manufacturing a free-form curved lens into a movable lens and a stationary lens according to the variation range of the lens thickness t, and mounting them in a frame to form a pair of glasses.

Preferably, the diopter is approximately linearly related to the diopter control amount $\Delta$.

Preferably, when the diopter variation range is [0, 1000] (i.e. [0/100, 1000/100] D), the corresponding $\Delta$ value has a variation range of [0, 0.02].

Preferably, the lens thickness t and the diopter control amount $\Delta$ satisfy the following formula: $t=A((x+\Delta)y^2+(x+\Delta)^3/3)$, wherein x and y are an X-axis direction coordinate value and a Y-axis direction coordinate value of any point on the lens in a rectangular coordinate system with the lens center as a coordinate origin and the lens optical axis as a Z axis; and A is a parameter related to the refractive index of a lens material.

Preferably, the stationary lens is disposed in the frame to be stationary relative to the frame, the movable lens is disposed in the frame and relatively movable relative to the stationary lens, and the diopter of the lens group is varied within its corresponding diopter variation range by varying the position of the movable lens relative to the stationary lens.

Preferably, the desired diopter of the receiving user comprises:

receiving the desired diopter transmitted by the user via a user terminal by using a control module disposed in the frame or detachably connected with the frame.

Preferably, the determining an adjustment amount of the movable lens required to move relative to the stationary lens in the lens group according to the desired diopter and the current diopter comprises:

determining a moving distance of the movable lens corresponding to the desired diopter and a moving distance of the movable lens corresponding to the current diopter by using a corresponding relationship between the diopter and the moving distance of the movable lens; and determining the adjustment amount of the movable lens required to move relative to the stationary lens according to the moving distance of the movable lens corresponding to the desired diopter and the moving distance of the movable lens corresponding to the current diopter.

Preferably, the difference between the current diopter and the desired diopter is at least equal to 1 (i.e. 1/100 D).

A device capable of recovering vision according to an embodiment of the present invention comprises:

a left lens group configured for being manufactured according to the vision recovery requirement of a user, wherein the diopter variation range of the left lens group is one of n diopter ranges with continuous diopter variation;

a right lens group configured for being manufactured according to the vision recovery requirement of the user, wherein the diopter variation range of the right lens group is one of the n diopter intervals;

a control module configured for inquiring a current diopter of the lens group after receiving a desired diopter of the user for any one of the left lens group and the right lens group, and determining an adjustment amount of the movable lens required to move relative to the stationary lens in the lens group according to the desired diopter and the current diopter; and an electric drive module configured for driving the movable lens to move according to the adjustment amount of the movable lens required to move relative to the stationary lens;

wherein the n diopter intervals are obtained by dividing a diopter variation range [0, N] (i.e. [0/100, N/100] D), and the diopter variation ranges of the 1st to nth diopter intervals are [0, N/n], [1+N/n, 2N/n], . . . , and [1+(n−1)N/n, N] (i.e. [0/100, (N/n)/100] D, [(1+N/n)/100, (2N/n)/100] D, . . . , and [(1+(n−1)N/n)/100, N/100] D).

The technical solution provided by the embodiments of the invention has the following beneficial effects:

1. According to the embodiment of the invention, the larger diopter variation range is divided into a plurality of smaller diopter intervals, and the lens groups corresponding to the plurality of diopter intervals are manufactured, so that the axial diopter variation has a higher precision when the movable lens of the lens group moves in parallel in the vertical axis direction relative to the stationary lens.

2. According to the embodiment of the invention, the driving of the movable lens is realized by the electric drive module, and the movable lens moves more accurately relative to the stationary lens, so that the diopter adjusting accuracy is improved;

3. According to the embodiment of the invention, the user can set a desired diopter via a user terminal, so that the user can independently and accurately adjust the diopter in an electric drive mode.

Figure 1:
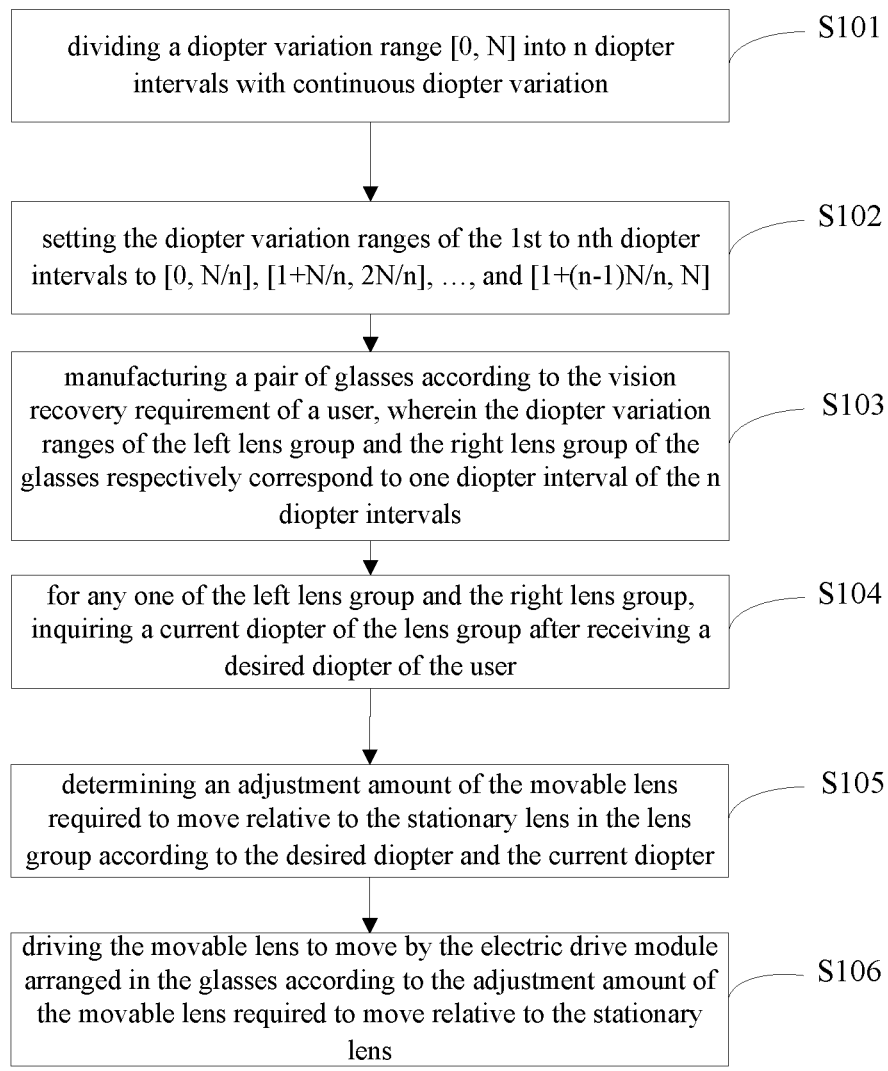
FIG. 1 is a schematic flow diagram of a method capable of recovering vision provided by an embodiment of the present invention.

Description of Reference Numerals: 1—frame shell; 2—leg; 3—nose pad; 40—USB interface; 41a—stationary lens; 41b—movable lens; 42a—stationary lens guide rail; 42b—movable lens guide rail; 43a—stationary lens guide rail attachment; 43b—movable lens guide rail attachment; 5—electric drive module; 50—drive module mounting bracket; 6—connecting attachment; 7—threaded sleeve.

DETAILED DESCRIPTION OF SPECIFIC EMBODIMENTS

Hereinafter, preferred embodiments of the present invention will be described in detail with reference to the accompanying drawings, and it should be understood that the preferred embodiments described below are merely illustrative and explanatory of the present invention and do not limit the present invention.

FIG. 1 is a schematic flow diagram of a method capable of recovering vision provided by an embodiment of the present invention, and as shown in FIG. 1, the method may include:

Step S101: dividing a diopter variation range [0, N] (i.e. [0/100, N/100] D) into n diopter intervals with continuous diopter variation.

Step S102: sequentially setting the diopter variation ranges of the 1st to nth diopter intervals to [0, N/n], [1+N/n, 2N/n], . . . , and [1+(n−1)N/n, N] (i.e. [0/100, (N/n)/100] D, [(1+N/n)/100, (2N/n)/100] D, . . . , and [(1+(n−1)N/n)/100, N/100] D).

For example, when N=1000 (i.e. N=1000/100 D=10.0 D) and n=10, the diopter variation ranges for the n diopter intervals are [0, 100], [101, 200], . . . , and [901, 1000], that is [0/100, 100/100] D, [101/100, 200/100] D, . . . , and [901/100, 1000/100] D.

For example, when N=800 (i.e. N=800/100 D=8.0 D) and n=10, the diopter variation ranges of the n diopter intervals are [0, 80], [81, 160], . . . , and [721, 800], that is [0/100, 80/100] D, [81/100, 160/100] D, . . . , and [721/100, 800/100] D.

Step S103: manufacturing a pair of glasses according to the vision recovery requirement of a user, wherein the diopter variation ranges of the left lens group and the right lens group of the glasses respectively correspond to one diopter interval of the n diopter intervals.

Selecting a diopter interval corresponding to the left lens group and a diopter interval corresponding to the right lens group from the n diopter intervals according to the vision recovery requirement of the user; and for any one of the left lens group and the right lens group, determining a variation range of a diopter control amount Δ corresponding to the diopter interval of the lens group according to the corresponding relationship between the diopter and the diopter control amount Δ, and determining a variation range of a lens thickness t corresponding to the variation range of the diopter control amount Δ according to the corresponding relationship between the lens thickness t and the diopter control amount Δ; and manufacturing a free-form curved lens into a movable lens and a stationary lens according to the variation range of the lens thickness t, and mounting them in a frame to form a pair of glasses.

The corresponding relationship between the diopter and the diopter control amount Δ can be obtained experimentally, and the results show that the two are approximately linear. When the diopter variation range is [0, 1000] (i.e. [0/100, 1000/100] D), the corresponding Δ value has a variation range of [0, 0.02].

The lens thickness t and the diopter control amount Δ satisfy the following formula: $t=A((x+\Delta)y^2+(x+\Delta)^3/3)$, wherein x and y are an X-axis direction coordinate value and a Y-axis direction coordinate value of any point on the lens in a rectangular coordinate system with the lens center as a coordinate origin and the lens optical axis as a Z axis; and A is a parameter related to the refractive index of a lens material.

The stationary lens is disposed in and stationary relative to the frame, the movable lens is disposed in the frame and relatively movable relative to the stationary lens, and the diopter of the lens group can be varied within the corresponding diopter variation range by varying the position of the movable lens relative to the stationary lens.

Assuming that N=1000 (i.e. N=1000/100 D=10.0 D) and n=10, the user's vision recovery requirement indicates that the current user's left eye vision is 150 (i.e. 150/100 D or 1.5 D), and the diopter range to be selected is [101, 200] (i.e. [101/100, 200/100] D or [1.01, 2.0] D); and then the variation range of the diopter control amount Δ corresponding to the diopter range [101, 200] (i.e. [101/100, 200/100] D or [1.01, 2.0] D) can be determined according to the approximate linear relationship between the diopter and the diopter control amount Δ. Further, the variation range of the lens thickness t is determined according to the corresponding relationship $t=A((x+\Delta)y^2+(x+\Delta)^3/3)$ of the lens thickness t and the diopter control amount Δ. Therefore, the free-form curved lens is manufactured into the movable lens and the stationary lens of the left lens group, which are mounted in the left frame of the frame. The manufacturing process of the right lens group is the same as that of the left lens group and will not be described in detail herein.

The free-form curved lens is a specially constructed lens and will not be described in detail herein.

Step S104: for any one of the left lens group and the right lens group, inquiring the current diopter of the lens group after receiving the desired diopter of the user.

The desired diopter transmitted by the user via a user terminal is received using a control module disposed (or fixedly disposed) in or detachably connected to the frame (e.g., connected via a USB port), and the current diopter is inquired from a memory after receiving the desired diopter.

Step S105: determining an adjustment amount of the movable lens required to move relative to the stationary lens in the lens group according to the desired diopter and the current diopter.

The control module determines the moving distance of the movable lens corresponding to the desired diopter and the moving distance of the movable lens corresponding to the current diopter according to the corresponding relation of the diopter and the moving distance of the movable lens, and determines the adjustment amount of the movable lens required to move relative to the stationary lens according to the moving distance of the movable lens corresponding to the desired diopter and the moving distance of the movable lens corresponding to the current diopter.

The corresponding relation between the diopter and the moving distance of the movable lens can be obtained in advance through an experimental mode and stored in a memory.

Step S106: driving the movable lens to move by the electric drive module arranged in the glasses according to the adjustment amount of the movable lens required to move relative to the stationary lens.

The electric drive module includes a stepping motor which can be fixedly disposed at a position, close to a leg, of the frame, wherein an external thread of an output rotating shaft (or a screw rod) of the stepping motor is matched with an internal thread of a connecting attachment of the movable lens, i.e. the output rotating shaft of the stepping motor is inserted inside the connecting attachment and is meshed with the internal thread of the connecting attachment. When the stepping motor receives an external electric signal, the screw rod of the motor rotates to push the movable lens to transversely displace relative to the stationary lens under the action of torque, so that the axial diopter is varied.

When implemented, the control module can comprise: a receiver for receiving a desired diopter transmitted by a user via a user terminal, a controller for generating an adjustment amount according to the desired diopter and the current diopter, and a stepping driver for driving a stepping motor according to the adjustment amount. The receiver, the controller and the stepping driver may employ existing chips. The adjusting amount can be the displacement of the movable lens required to move relative to the stationary lens, and the controller determines an angle required by the stepping motor to rotate when the movable lens moves in the displacement according to the displacement so as to determine the number of pulse signals required to be output. Therefore, when each pulse signal is received by the stepping driver, the output rotating shaft of the stepping motor is driven to rotate by a fixed angle according to a set direction, and the rotation of the output rotating shaft drives the movable lens to transversely move, namely, the angular displacement amount of the output rotating shaft is converted into the displacement adjusting amount of the movable lens.

If the diopter variation precision is to be improved, the variation precision of the transverse relative displacement should reach a nanometer level, that is, a nanometer micromotor is required, which is difficult to realize at the current industrial level. In order to realize high-precision variation and accurate adjustment, the large-variation-range diopter interval is divided into a plurality of small-variation-range diopter intervals, and the diopter variation precision of the lens group corresponding to each small-variation-range diopter interval is related to the diopter control amount Δ. After many experiments, it is found that the variation of the transverse relative displacement of the moving lens can be reduced to the micrometer level by selecting the appropriate Δ value. At the current industry level, it is easy to manufacture micrometer-level micro-motors. For example, a diopter is varied from 0 (i.e. 0/100 D) to 1000 (i.e. 1000/100 D), originally achieved by a pair of eyeglasses, which is difficult to achieve precise control of, for example, 1 (i.e. 1/100 D); and when a diopter is varied from 0 (i.e. 0/100 D) to 1000 (i.e. 1000/100 D), achieved with 10 sets of lenses, each group having an interval of 100 (i.e. 100/100 D), the precise control can be achieved by selecting 10 groups of diopter control amount Δ values corresponding to the 10 groups of lenses.

Figure 2:
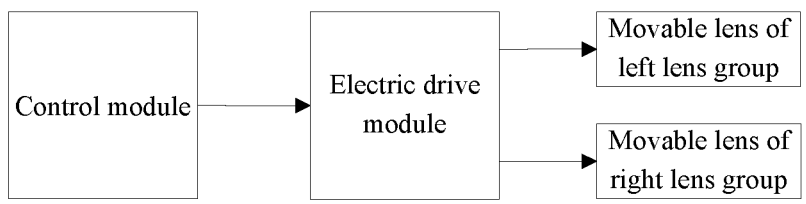
FIG. 2 is a schematic block diagram of a device capable of recovering vision provided by an embodiment of the present invention.

FIG. 2 is a schematic block diagram of a device capable of recovering vision provided by an embodiment of the present invention. As shown in FIG. 2, the device may include:

a left lens group configured for being manufactured according to the vision recovery requirement of a user, wherein the diopter variation range of the left lens group is one of n diopter ranges with continuous diopter variation;

a right lens group configured for being manufactured according to the vision recovery requirement of the user, wherein the diopter variation range of the right lens group is one of the n diopter intervals;

a control module configured for inquiring a current diopter of the lens group after receiving a desired diopter of the user for any one of the left lens group and the right lens group, and determining an adjustment amount of the movable lens required to move relative to the stationary lens in the lens group according to the desired diopter and the current diopter; and an electric drive module configured for driving the movable lens to move according to the adjustment amount of the movable lens required to move relative to the stationary lens;

wherein the n diopter intervals are obtained by dividing a diopter variation range [0, N] (i.e. [0/100, N/100] D), and the diopter variation ranges of the 1st to nth diopter intervals are [0, N/n], [1+N/n, 2N/n], . . . , and [1+(n−1)N/n, N], that is [0/100, 80/100] D, [81/100, 160/100] D, . . . , and [721/100, 800/100] D.

The device of FIG. 2 will now be described in more detail with reference to FIGS. 3 to 11.

Figure 3:
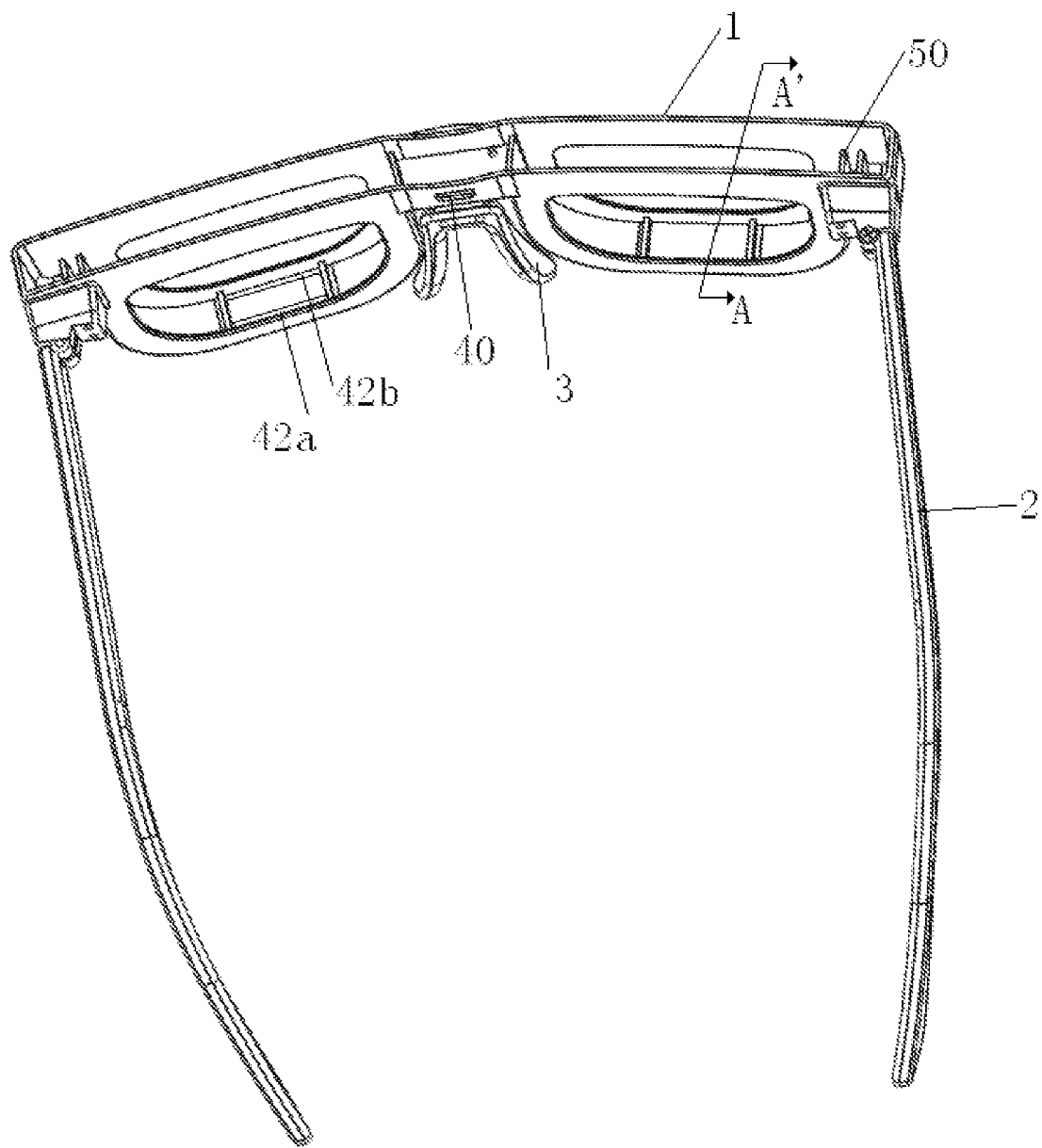
FIG. 3 is a structurally schematic view of a frame c an embodiment of the present invention.

The frame shown in FIG. 3 includes a frame shell 1, legs 2 and a nose pad 3.

The frame shell 1 has a left frame and a right frame.

The inner surfaces bottom of the left and right frames each have a movable lens guide rail 42b for disposing the movable lens and a stationary lens guide rail 42a for disposing the stationary lens. In an embodiment, the movable lens guide rail 42b is a rectangular groove formed in the inner surface of the bottom of the frame and parallel to the movable lens 41b; correspondingly, the stationary lens guide rail 42a is a rectangular groove formed in the inner surface of the bottom of the frame and parallel to the movable lens guide rail 42b; and further, both ends of the stationary lens guide rail 42a extend toward the moving lens guide rail 42b to a side of the movable lens guide rail 42b away from the stationary lens guide rail 42a. In another embodiment, the movable lens guide rail 42b is a rectangular rib formed on the inner surface of the bottom of the frame and parallel to the movable lens 41b, and the stationary lens guide rail 42a is a rectangular rib formed on the inner surface of the bottom of the frame and parallel to the movable lens guide rail 42b. Further, both ends of the stationary lens guide rail 42a extend toward the movable lens guide rail 42b and extend to a side of the movable lens guide rail 42b away from the stationary lens guide rail 42a.

Herein, a drive module mounting bracket 50, which can be integrally formed with the frame shell 1 for fixing the electric drive module of FIG. 2, is provided at a position of the frame shell 1 close to the leg.

The glasses legs 2 and the frame shell 1 can be connected via a movable shaft.

The nose pad can be connected with the frame shell 1 via screws or integrally formed with the frame shell 1.

The control module of FIG. 2 may be fixedly disposed at any position within the frame or may be detachably connected with the frame. In an embodiment, if the control module of FIG. 2 is detachably connected to the frame, the frame shell 1 is provided with a USB interface (i.e. a motor control interface) 40, which can be provided at any position of the frame shell 1, such as in the middle of the frame shell 1, for accessing the control module. The control module is electrically connected to the electric drive module via a USB interface (i.e. a motor control interface) 40 provided on the frame.

Figure 4:
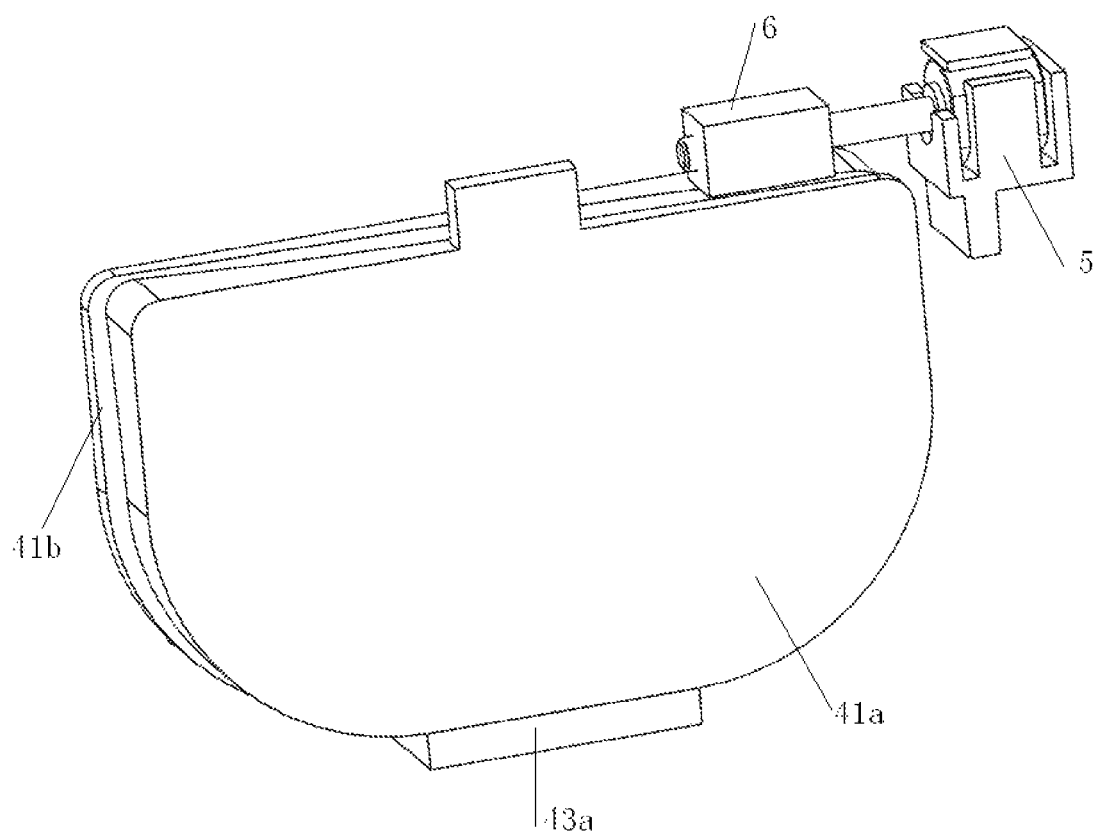
FIG. 4 is a structurally schematic view of a lens group and an electric drive module coordinated with the frame of FIG. 3.
Figure 5:
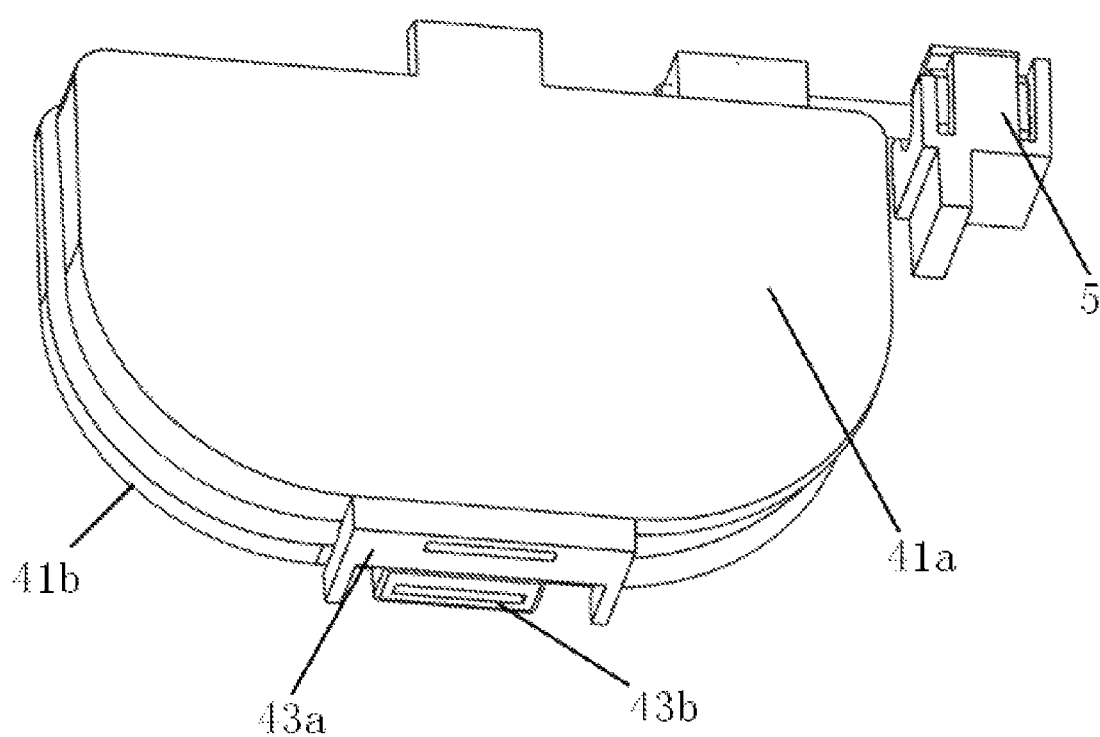
FIG. 5 is a structurally schematic view of FIG. 4 viewed from the underside.

As shown in FIGS. 4 and 5, the left lens group and the right lens group each include two layers of lenses, one layer of lens is a stationary lens 41a that is stationary with respect to the frame shell 1, and the other layer of lens is a movable lens 41b having a connecting attachment 6 that is movable with respect to the stationary lens 41a. The stationary lens 41a and the movable lens 41b in one lens group are free-form curved lenses having the same lens parameters.

Figure 7:
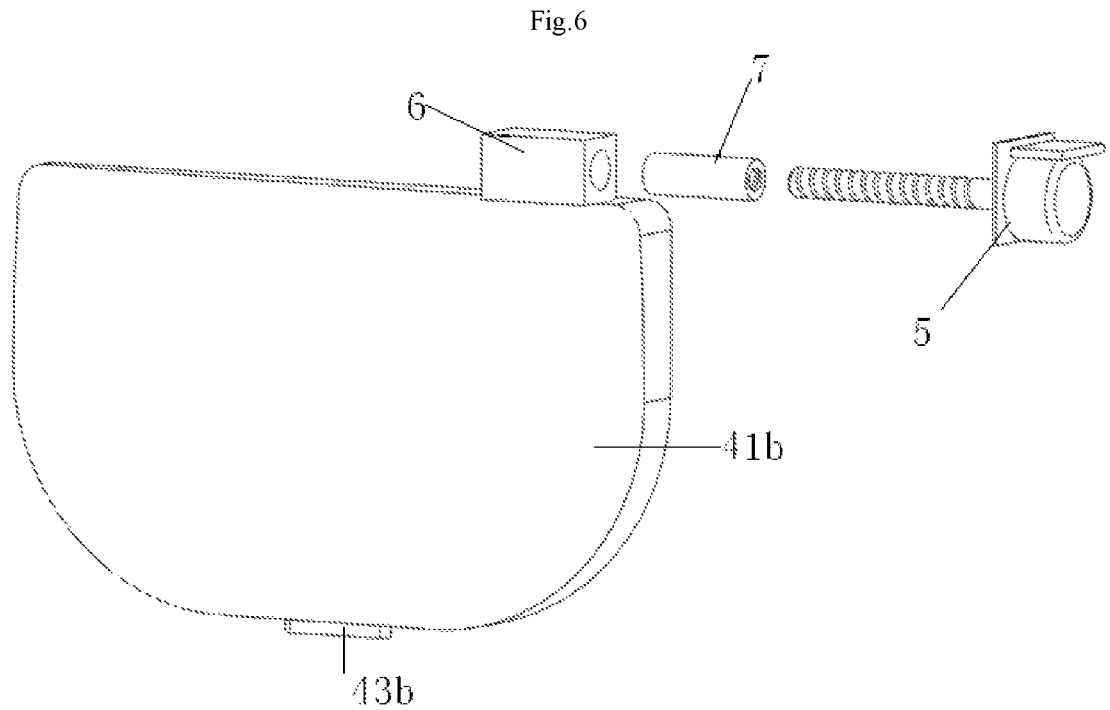
FIG. 7 is a schematic view of prior to a movable lens being connected with the electric drive module.
Figure 8:
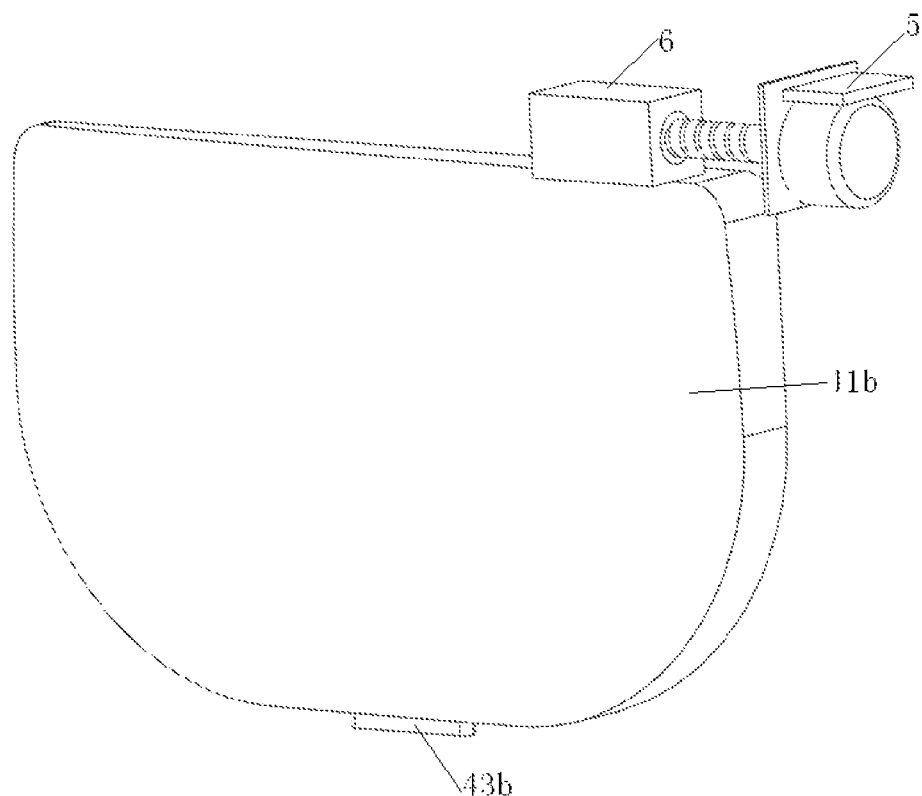
FIG. 8 is a schematic view after the movable lens being connected with the electric drive module.

The movable lens 41b includes a lens body and a connecting attachment 6 at an upper edge of the lens body, wherein the connecting attachment 6 is internally threaded. In an embodiment, as shown in FIGS. 7 and 8, the connecting attachment 6 includes a hollow protrusion integrally formed with the movable lens 41b, and a threaded sleeve 7 fixedly disposed (e.g., adhered) in the hollow protrusion, an output shaft of the electric drive module 5 is inserted into the threaded sleeve 7, and the connecting attachment 6 and the movable lens 41b are moved by rotation of the output shaft.

The bottom of the stationary lens 41a is provided with a stationary lens guide rail attachment 43a fixedly connected (for example, bonded) with the stationary lens 41a, the bottom of the movable lens 41b is provided with a movable lens guide rail attachment 43b fixedly connected (for example, bonded) with the movable lens 41b, and the length of the movable lens guide rail attachment 43b is less than that of the stationary lens guide rail attachment 43a; and both ends of the stationary lens guide rail attachment 43a extend in the direction of the movable lens guide rail attachment 43b to a side away from the stationary lens guide rail attachment 43a for limiting the moving range of the movable lens 41b.

In an embodiment, if a movable lens guide rail 42b and a stationary lens guide rail 42a are grooves, a movable lens guide rail attachment 43b has a protrusion that is deposed in, tightly fits with and is movable along the groove; and a stationary lens guide rail attachment 43a has a protrusion that is deposed in and fixed (e.g., clamped) to the groove. In another embodiment, if the movable lens guide rail 42b and the stationary lens guide rail 42a are ribs, the movable lens guide rail attachment 43b has grooves that fit closely with the ribs and are movable along the ribs, and the stationary lens guide rail attachment 43a has grooves that are deposed on and fixed (e.g., clamped) to the ribs.

Figure 6:
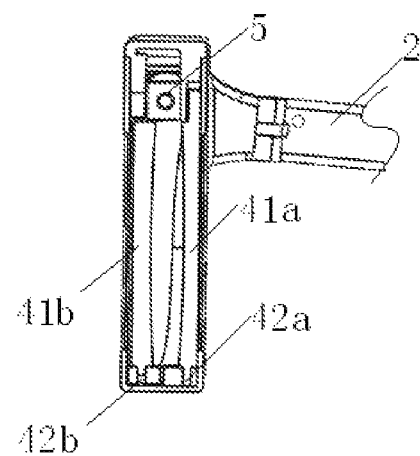
FIG. 6 is an AA' cross-sectional view after the lens group and the electric drive module of FIG. 4 mounted to the frame of FIG. 3.

A left lens group and a right lens group are respectively deposed in a left frame and a right frame, and as shown in FIG. 6, the stationary lens 41a is fixedly deposed on the stationary lens guide rail 42a via the stationary lens guide rail attachment 43a and is close to a glasses leg 2; and the movable lens 41b is deposed on the movable lens guide rail 42b via the movable lens guide rail attachment 43b and is movable along the movable lens guide rail 42b away from the leg 2.

The electric drive module 5 includes a stepping motor for driving the movable lens 41b to move, and a base for placing the stepping motor, wherein the stepping motor with the base is arranged in a drive module mounting bracket 50 shown in FIG. 3, and the drive module mounting bracket 50 is arranged at a position close to the glasses leg 2 of the frame shell 1.

Figure 9:
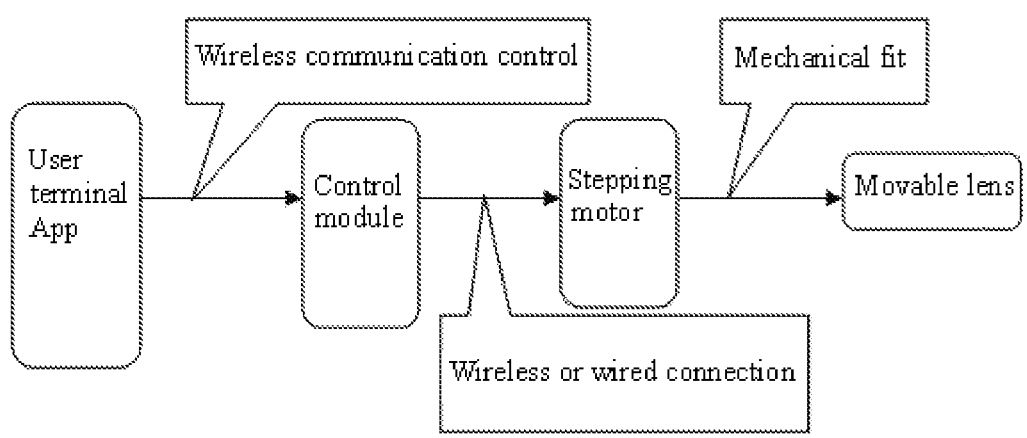
FIG. 9 is a first schematic diagram of an electronic control portion of a device capable of recovering vision provided by an embodiment of the present invention.
Figure 10:
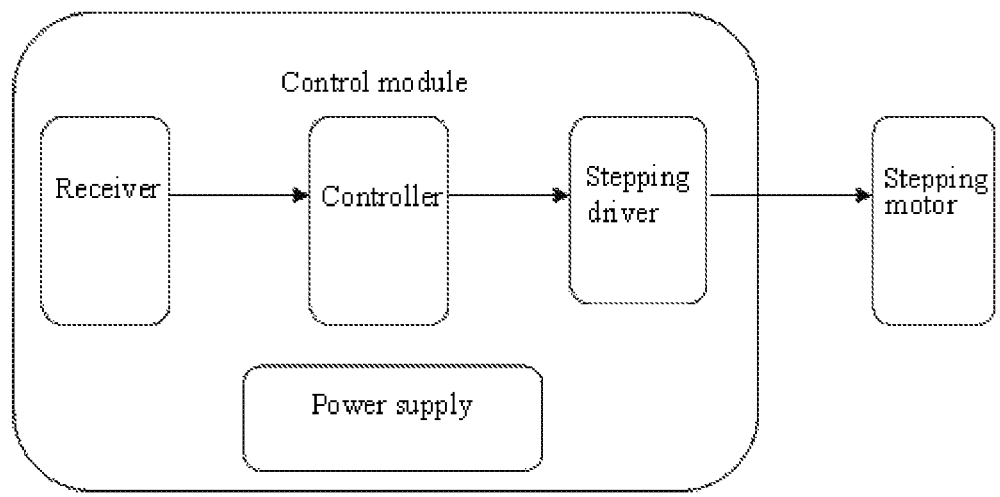
FIG. 10 is a structurally schematic view of a control module of FIG. 9.
Figure 11:
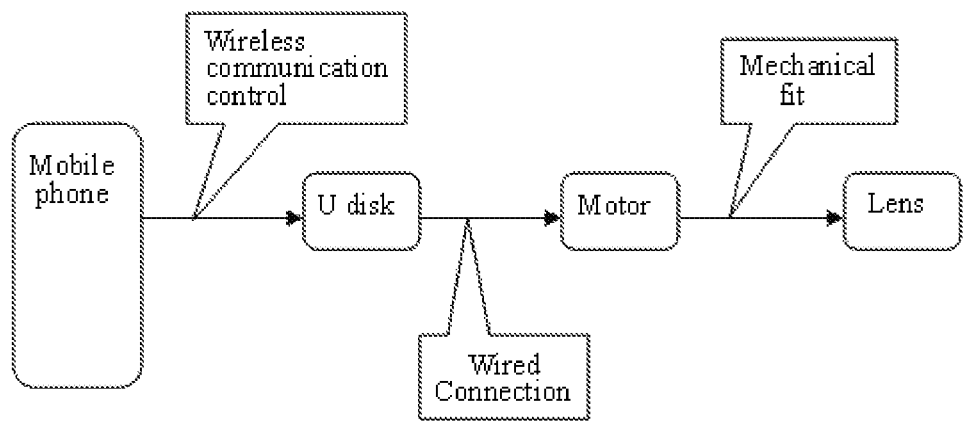
FIG. 11 is a second schematic diagram of the electronic control portion of the device capable of recovering vision provided by the embodiment of the present invention.

FIGS. 9 to 11 are schematic diagrams of an electronic control part provided by the embodiment of the invention. As shown in FIG. 9, a control module receives a desired diopter sent by a user via a user terminal app in a wireless communication control mode, then generates an adjustment amount according to the desired diopter and the current diopter, and drives an output rotating shaft of a stepping motor in a wireless or wired connection mode to drive a movable lens to move via a mechanical fit mode. When the rotating shaft of the stepping motor rotates, the threaded sleeve and the lens are pushed to move together according to a mechanical principle. Because the stepping motor can accurately control a rotation angle, the accurate movement of the lens can be controlled, and the diopter accuracy of the glasses is improved, for example, it can be achieved to 1 (i.e. 1/100 D). That is, the user in the embodiment of the invention can send the instruction of the diopter variation to the control module of the stepping motor via the user terminal in a wireless or wired manner, and the instruction is performed by the stepping motor, so that the user can independently control the diopter variation of glasses.

The control module of an embodiment of the present invention may employ an existing control circuit. For example, the control circuit may include a receiver configured for receiving a desired diopter as shown in FIG. 10; a controller configured for generating an adjustment amount according to the desired diopter and a current diopter; and a stepping driver configured for driving the stepping motor according to the adjustment amount, and the output end of the stepping driver is connected with the stepping motor. Among other things, the receiver, controller and stepping driver may all employ existing chips. The user terminal can be a mobile phone as shown in FIG. 11, a tablet computer and the like. The control module can be a U disk as shown in FIG. 11, i.e. connected with a USB port provided in FIG. 3 by a USB connection mode so as to control the stepping motor.

Application Examples

The diopter variation range [0, 1000] (i.e. [0/100, 1000/100] D or [0, 10.0] D) is divided into 10 diopter intervals with continuous diopter variation, and the diopter variation ranges of the 10 diopter intervals are [0, 100], [101, 200], . . . , and [901, 1000], that is [0/100, 100/100] D, [101/100, 200/100] D, . . . , and [901/100, 1000/100] D.

When the user vision recovery requirement indicates that the vision of the left eye and the right eye of the current user is 150 (i.e. 150/100 D=1.5 D), the diopter interval required to be selected is [101, 200] (i.e. [101/100, 200/100] D or [1.01, 2.0] D), and the diopter variation ranges of the left lens group and the right lens group of the user both correspond to the diopter interval [101, 200] (i.e. [101/100, 200/100] D or [1.01, 2.0] D).

The right lens group is exemplified below.

According to the approximate linear relationship between the diopter and the diopter control amount Δ, it can determine the variation range of the diopter control amount Δ corresponding to the diopter interval [101, 200] (i.e. [101/100, 200/100] D or [1.01, 2.0] D), and further according to the corresponding relationship between the lens thickness t and the diopter control amount Δ, it determines the variation range of the lens thickness t, and then the free-form curved lens is manufactured into the movable lens and the stationary lens of the right lens group.

The stationary lens is fixedly mounted on a stationary lens guide rail on an inner surface of the bottom of a right frame via a stationary lens guide rail attachment fixedly connected to the bottom of the stationary lens.

An output rotating shaft of the electric drive module is inserted into a connecting attachment of the movable lens, the electric drive module is placed on a drive module mounting bracket, and the stationary lens is mounted on a movable lens guide rail on the inner surface of the bottom of the right frame via a movable lens guide rail attachment fixedly connected to the bottom of the movable lens.

When in use, a U disk served as a control module is inserted into a motor control interface on a frame, and then the control module calculates an adjustment amount according to a received desired diopter to the right eye sent by a user via a user terminal and an inquired current diopter of the right lens group, and drives an output rotating shaft of the electric drive module to rotate according to the adjustment amount to move the movable lens of the right lens group so as to reach the desired diopter.

The manufacturing, mounting and using processes of the left lens group are similar to those of the right lens group and will not be described in detail herein.

It has been shown by the related art that continuous wear of lower diopter eyeglasses can be used to treat myopia and hyperopia. By embodiments of the present invention, a user can continuously adjust the diopter of the eyeglasses to a lower diopter than the actual diopter of the eye. For example, the actual diopter of the eye is 256 (i.e. 256/100 D or 2.56 D) for myopia, and the diopter of the glasses can be adjusted to 255 (i.e. 255/100 D or 2.55 D) for myopia, thereby recovering the user's myopia from 256 (i.e. 256/100 D or 2.56 D) to 255 (i.e. 255/100 D or 2.55 D). According to the embodiment of the invention, the glasses can have a minimum adjustment of 1 (i.e. 1/100 D or 0.01 D); when the user wears the glasses lower than the actual diopter by 1 (i.e. 1/100 D or 0.01 D) for a long time, the vision recovery can be realized, and the method is applicable to users with different self-adaptive abilities.

Although the present invention has been described in detail above, the present invention is not limited thereto, and various modifications may be made by those skilled in the art in accordance with the principles of the present invention. Therefore, any modification made according to the principle of the present invention should be understood to fall within the protection scope of the present invention.

The invention claimed is:

1. A method of recovering vision by using a pair of glasses, comprising:
   dividing a diopter range [0/100, N/100] D into n diopter intervals with continuous diopter variation,
   making the diopter variation ranges of n diopter intervals to be [0/100, (N/n)/100] D, [(1+N/n)/100, (2N/n)/100] D, . . . , and [(1+(n−1)N/n)/100, N/100] D, wherein N is greater than n, N and n are positive integers;
   selecting a first diopter interval and a second diopter interval from the n diopter intervals according to a user's vision recovery requirement which is lower than the user's actual diopter;
   selecting a left lens group corresponding to the first diopter interval and a right lens group corresponding to the second diopter interval of the glasses, which both the left lens group and the right lens group include a movable lens and a stationary lens; and
   continuously adjusting the diopter of the glasses to be lower than the user's actual diopter, comprising:
   determining a current diopter of each lens group corresponding to the current position of the movable lens;
   determining an adjustment amount of the movable lens to move relative to the stationary lens in each lens group according to the user's desired diopter and the current diopter of each lens group; and
   driving the movable lens of each lens group to move by an electric drive module arranged in the glasses according to the adjustment amount of the movable lens to move relative to the stationary lens, so that the adjusted diopter of each lens group satisfy the user's vision recovery requirement.

2. The method according to claim 1, further comprising:
determining the variation range of the thickness t of the movable lens and the stationary lens of each lens group, which comprises:
  determining a range of a diopter control amount Δ corresponding to the diopter interval of each lens group according to the corresponding relationship between the diopter and the diopter control amount Δ;
  determining a variation range of a lens thickness t corresponding to the range of the diopter control amount Δ according to the corresponding relationship between the lens thickness t and the diopter control amount Δ.

3. The method according to claim 2, wherein the diopter is approximately linearly related to the diopter control amount Δ.

4. The method according to claim 3, characterized in that when the diopter range is [0/100, 1000/100] D, the corresponding Δ value has a variation range of [0, 0.02].

5. The method according to claim 2, wherein the lens thickness t and the diopter control amount Δ satisfy the following formula: $t=A((x+\Delta)y^2+(x+\Delta)^3/3)$; wherein x and y are a X-axis coordinate value and a Y-axis coordinate value of any point on the lens in a rectangular coordinate system with the center of the lens as a coordinate origin and the optical axis of the lens as a Z axis; and A is a parameter related to a refractive index of the lens material.

6. The method according to claim 2, wherein the stationary lens is disposed in the frame of the glasses and is stationary relative to the frame, the movable lens is disposed in the frame and is relatively movable relative to the stationary lens, and the diopter of the lens group is varied within its corresponding diopter intervals by varying the position of the movable lens relative to the stationary lens.

7. The method of claim 1, further comprising:
getting the user's desired diopter, which comprises:
  receiving the desired diopter transmitted by the user via a user terminal by using a control module disposed in the frame of the glasses or detachably connected with the frame.

8. The method of claim 1, wherein the determining an adjustment amount of the movable lens to move relative to the stationary lens in each lens group according to the user's desired diopter and the current diopter of each lens group comprises:
  determining a moving distance of the movable lens corresponding to the desired diopter and a moving distance of the movable lens corresponding to the current diopter by using a corresponding relationship between the diopter and the moving distance of the movable lens; and
  determining the adjustment amount of the movable lens required to move relative to the stationary lens according to the moving distance of the movable lens corresponding to the desired diopter and the moving distance of the movable lens corresponding to the current diopter.

9. The method of claim 1, wherein the difference between the current diopter and the desired diopter is at least equal to 1/100 D.

10. A device for recovering vision, comprises:
  a left lens group, having one diopter interval among n diopter intervals with continuous diopter variation, which satisfy a user's vision recovery requirement lower than the user's actual diopter;
  a right lens group, having one diopter interval among n diopter intervals with continuous diopter variation, which satisfy the user's vision recovery requirement lower than the user's actual diopter;
  a control module configured for determining a current diopter of each lens group corresponding to the current position of the movable lens after receiving the user's desired diopter, and determining an adjustment amount of a movable lens required to move relative to a stationary lens in each lens group according to the user's desired diopter and the current diopter of each lens group; and
  an electric drive module configured for driving the movable lens to move according to the adjustment amount of the movable lens required to move relative to the stationary lens, so that the adjusted diopter of each lens group satisfy the user's vision recovery requirement;
  wherein the n diopter intervals are obtained by dividing a diopter range [0/100, N/100] D, and the diopter variation ranges of the 1st to nth diopter intervals are [0/100, (N/n)/100] D, [(1+N/n)/100, (2N/n)/100] D, . . . , and [(1+(n−1)N/n)/100, N/100] D, N is greater than n, N and n are positive integers;
  wherein the control module and the electric drive module continuously adjust the diopter of the glasses to be lower than the user's actual diopter.

* * * * *